US012405596B2

(12) United States Patent
Kataoka et al.

(10) Patent No.: US 12,405,596 B2
(45) Date of Patent: Sep. 2, 2025

(54) IDENTIFIER MANAGEMENT METHOD, ROBOT CONTROL DEVICE, AND COMPREHENSIVE CONTROL DEVICE

(71) Applicant: Panasonic Intellectual Property Management Co., Ltd., Osaka (JP)

(72) Inventors: Hisashi Kataoka, Osaka (JP); Toshinari Mohri, Osaka (JP); Kazuki Hanada, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 788 days.

(21) Appl. No.: 17/716,160

(22) Filed: Apr. 8, 2022

(65) Prior Publication Data

US 2022/0229418 A1 Jul. 21, 2022

Related U.S. Application Data

(63) Continuation of application No. PCT/JP2020/037359, filed on Sep. 30, 2020.

(30) Foreign Application Priority Data

Oct. 11, 2019 (JP) .................. 2019-188156

(51) Int. Cl.
*G05B 19/41* (2006.01)
*G05B 19/4155* (2006.01)
*B23K 37/02* (2006.01)

(52) U.S. Cl.
CPC ...... *G05B 19/4155* (2013.01); *B23K 37/0229* (2013.01); *G05B 2219/45104* (2013.01)

(58) Field of Classification Search
USPC .......................................... 700/116
See application file for complete search history.

(56) References Cited

U.S. PATENT DOCUMENTS 6,516,239 B1 * 2/2003 Madden ............ G05B 19/4183
700/228
6,583,386 B1 * 6/2003 Ivkovich ............. B23K 31/125
228/103

(Continued)

FOREIGN PATENT DOCUMENTS

CN 1919516 2/2007
JP 2007-304999 11/2007

(Continued)

OTHER PUBLICATIONS

JP_2008059116_A (Year: 2008).*

(Continued)

*Primary Examiner* — Hien D Khuu
(74) *Attorney, Agent, or Firm* — Wenderoth, Lind & Ponack, L.L.P.

(57) ABSTRACT

An identifier management method is executed by a welding system. The identifier management method includes: acquiring information on identifiers of a plurality of original workpieces; selecting, according to a predetermined rule, any one of the identifiers of the plurality of original workpieces to be adopted based on completion of execution of a welding process using the plurality of original workpieces by the welding system; and setting the any one of identifiers of the plurality of original workpieces, which has been selected, as an identifier of the welded workpiece generated in the welding process.

9 Claims, 11 Drawing Sheets

(56) References Cited

U.S. PATENT DOCUMENTS

| | | | |
|---|---|---|---|
| 2007/0051711 A1 | 3/2007 | Kachline | |
| 2010/0114355 A1 | 5/2010 | Harashima et al. | |
| 2013/0200056 A1 | 8/2013 | Kachline | |
| 2013/0200058 A1 | 8/2013 | Kachline | |
| 2014/0263227 A1* | 9/2014 | Daniel | B23K 9/0953 219/130.01 |
| 2014/0278242 A1 | 9/2014 | Lamers et al. | |
| 2015/0158109 A1 | 6/2015 | Chantry | |
| 2015/0278721 A1 | 10/2015 | Oku | |
| 2015/0328710 A1 | 11/2015 | Kachline | |
| 2017/0066092 A1 | 3/2017 | Yamamoto | |
| 2017/0153616 A1 | 6/2017 | Sakakibara et al. | |
| 2019/0168329 A1 | 6/2019 | Kachline | |

FOREIGN PATENT DOCUMENTS

| | | |
|---|---|---|
| JP | 2008-059116 | 3/2008 |
| JP | 2010-49521 | 3/2010 |
| JP | 2010-113425 | 5/2010 |
| JP | 2014-117720 | 6/2014 |
| JP | 2015-153196 | 8/2015 |
| JP | 2015-171736 | 10/2015 |
| JP | 2017-102548 | 6/2017 |

OTHER PUBLICATIONS

JP_2017102548_A (Year: 2017).*
CN_101973032_B (Year: 2013).*
EP_4043158_A1 (Year: 2022).*
Extended European Search Report issued Nov. 7, 2022 in corresponding European Patent Application No. 20874958.0.
First Office Action issued May 27, 2024 in corresponding Chinese Patent Application No. 202080071052.1, with English-language Translation.
Wang Yankai, "Design and Development of Conveying System for Body in White Flexible Welding Workshop", China Academic Journal Electronic Publishing House, "Chinese Excellent Master's Thesis Full Text Database (Engineering Science and Technology II)", Issue 4, pp. 1-4, Published: Apr. 2019.
International Search Report issued Dec. 1, 2020 in International (PCT) Application No. PCT/JP2020/037359 with English translation.
Written Opinion of the International Searching Authority issued Dec. 1, 2020 in International (PCT) Application No. PCT/JP2020/037359.

* cited by examiner

FIG. 5

IN CASE OF ID "ABC001XYZ999"

(STRENGTH RULE 1) SET SEGMENTS OF ALPHABET AND NUMBER, AND COMPARE STRENGTH FOR EACH SEGMENTS
(STRENGTH RULE 2) STRONGER AS ALPHABET IS EARLIER, AND STRONGER AS NUMBER IS LARGER

FIG. 6A

| EXISTING ID | MANAGEMENT ID |
|---|---|
| RR70-001 | AAA001 |
| RR70-002 | AAA002 |
| RR70-003 | AAA003 |
| ... | ... |

XTB1

IDENTIFIER MANAGEMENT METHOD, ROBOT CONTROL DEVICE, AND COMPREHENSIVE CONTROL DEVICE

CROSS-REFERENCE TO RELATED APPLICATIONS

This application is a continuation of PCT International Patent Application No. PCT/JP2020/037359 filed on Sep. 30, 2020, which claims the benefit of priority of Japanese Patent Application No. 2019-188156 filed on Oct. 11, 2019, the entire contents of which are incorporated herein by reference.

FIELD

The present disclosure relates to an identifier management method, a robot control device, and a comprehensive control device.

BACKGROUND

JP-A-2017-102548 discloses a production management device that manages production performance information on a manufacturing line in which a plurality of manufacturing machines are arranged. The production management device detects which manufacturing machine a workpiece supplied to the manufacturing line is located in, generates an identifier unique to the workpiece when it is detected that the workpiece is located in any manufacturing machine, notifies the manufacturing machine in which the workpiece is located, and receives and records the generated identifier and the production performance information at the time of processing the workpiece corresponding to the identifier from the manufacturing machine. Each time the workpiece is sequentially moved to each of a plurality of manufacturing machines, the production management device records a plurality of identifiers generated for the workpiece and identifiers of products completed by the workpiece in association with each other.

According to JP-A-2017-102548, a production management device can manage traceability data for each workpiece. However, in the configuration of JP-A-2017-102548, different identifiers are newly assigned each time the same workpiece is located in a plurality of different manufacturing machines. In other words, each time one workpiece is sequentially located on another manufacturing machine in a manufacturing line, the one workpiece has a plurality of different identifiers. Therefore, for example, when a plurality of workpieces are joined and another workpiece is manufactured as in a welding process, if a new identifier is assigned to the manufactured workpiece in accordance with JP-A-2017-102548, a relationship between an identifier of the workpiece used in the welding process and an identifier of the manufactured workpiece may be complicated, and thus it may be difficult to use traceability related to the manufactured workpiece. That is, management of the identifier of the workpiece is complicated, and work efficiency of a system administrator is deteriorated.

SUMMARY

The present disclosure provides an identifier management method, a robot control device, and a comprehensive control device, which support more efficient management of an identifier of a workpiece manufactured in a process such as welding, an identification sign assignment device, and a weldment.

The present disclosure provides an identifier management method to be executed by a welding system, the identifier management method including: acquiring information on identifiers of a plurality of original workpieces; selecting, according to a predetermined rule, any one of the identifiers of the plurality of original workpieces to be adopted based on completion of execution of a welding process using the plurality of original workpieces by the welding system; and setting the any one of the identifiers of the original workpieces, which has been selected, as an identifier of the welded workpiece generated in the welding process.

The present disclosure provides a robot control device constituting a welding system, the robot control device including: a memory configured to hold information on identifiers of a plurality of original workpieces; a processor configured to control a welding robot to allow execution of a welding process using the plurality of original workpieces; and a communication unit configured to communicate with a comprehensive control device that performs comprehensive control of the welding system, wherein the processor is configured to: select, according to a predetermined rule, any one of the identifiers of the respective original workpieces to be adopted based on completion of the execution of the welding process by the welding robot, and transmit, to the comprehensive control device via the communication unit, a setting request for setting, as an identifier of a welded workpiece generated in the welding process, the any one of the identifiers of the original workpieces which has been selected.

The present disclosure provides a comprehensive control device constituting a welding system, the comprehensive control device including: a memory configured to hold information on identifiers of a plurality of original workpieces; a communication unit configured to communicate with a robot control device configured to control execution of a welding process using the plurality of original workpieces; and a processor configured to select, according to a predetermined rule, any one of the identifiers of the plurality of original workpieces to be adopted based on detection of completion of the execution of the welding process by the robot control device, wherein the processor is configured to: set, as an identifier of a welded workpiece generated in the welding process, the any one of the identifiers of the original workpieces which has been selected.

According to the present disclosure, it is possible to support more efficient management of an identifier of a workpiece manufactured in a process such as welding.

BRIEF DESCRIPTION OF DRAWINGS

FIG. 5 is a diagram showing an example of an ID strength rule.

FIG. 6A is a diagram showing an example of a correspondence table between existing IDs and management IDs.

DETAILED DESCRIPTION (Introduction to Present Disclosure)

Therefore, in light of the challenges of JP-A-2017-102548, in the following embodiments, examples of an identifier management method, a robot control device, and a comprehensive control device, which support more efficient management of the identifier of the workpiece manufactured in a process such as welding will be described.

Hereinafter, embodiments specifically disclosing an identifier management method, a robot control device, and a comprehensive control device according to the present disclosure will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided to enable those skilled in the art to fully understand the present disclosure, and are not intended to limit the range of the claims.

First Embodiment

The welding system according to the first embodiment acquires information on identifiers of a plurality of original workpieces, and selects any one of identifiers of respective original workpieces to be adopted according to a predetermined rule based on completion of execution of a welding process using the plurality of original workpieces. The welding system sets the any one of the identifiers of the original workpieces, which has been selected, as the identifier of the welded workpiece produced in the welding process. Hereinafter, the workpiece used in the welding process is defined as an "original workpiece", and the workpiece produced in the welding process is defined as a "welded workpiece". The "welded workpiece" may be referred to as a "secondary workpiece" or an "n-th workpiece" (n: an integer of 2 or more).

(Configuration of Welding System)

Figure 1:
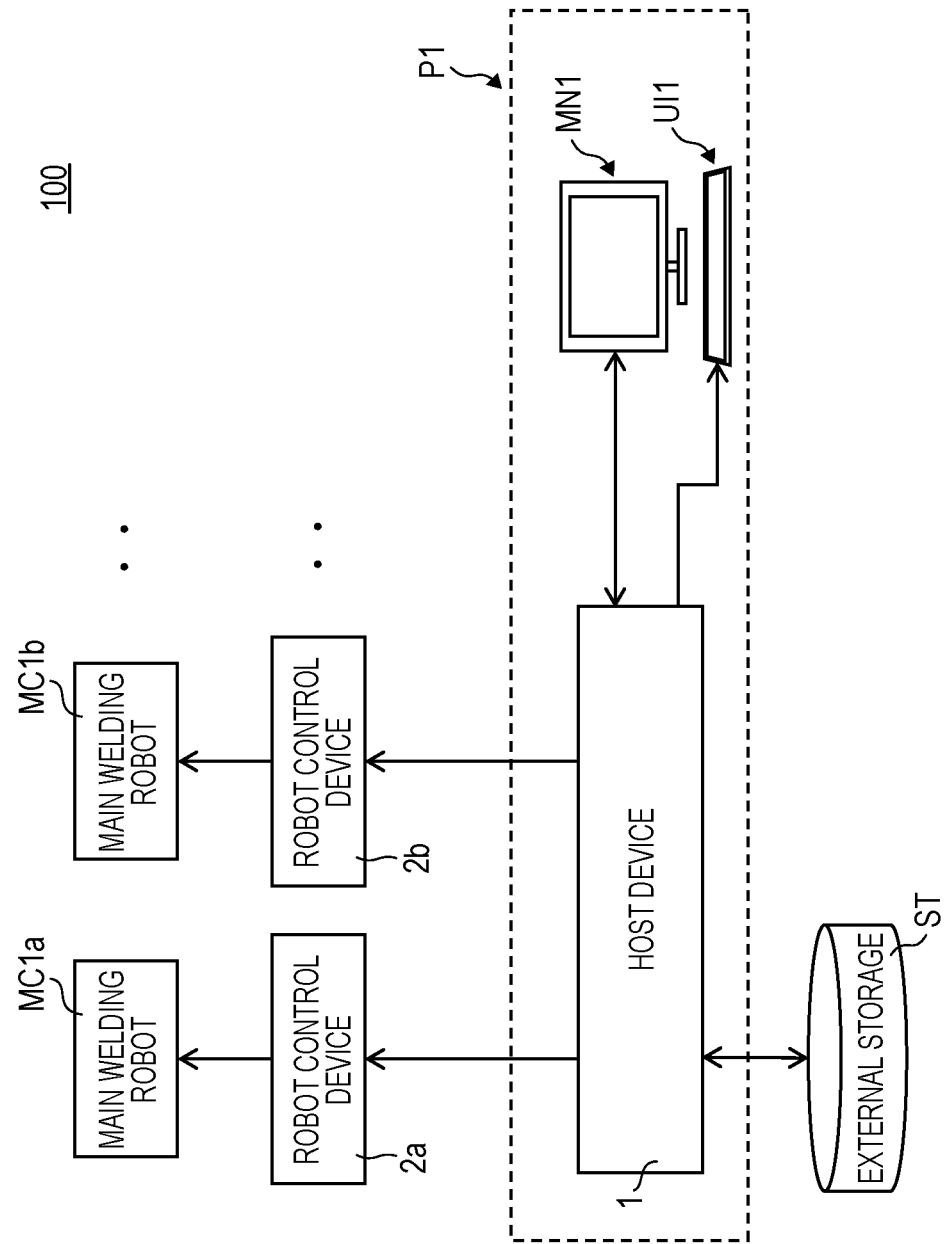
FIG. 1 is a schematic diagram showing a system configuration example of a welding system.

FIG. 1 is a schematic diagram showing a system configuration example of a welding system 100. The welding system 100 includes a host device 1 connected to each of an external storage ST, an input interface UI1, and a monitor MN1, a plurality of robot control devices (for example, robot control devices 2a and 2b), and a plurality of main welding robots (for example, main welding robots MC1a and MC1b). The robot control device 2a is provided corresponding to the main welding robot MC1a, the robot control device 2b is provided corresponding to the main welding robot MC1b, and the same number of robot control devices are similarly provided corresponding to one main welding robot.

The host device 1 serving as an example of a comprehensive control device integrally controls the execution of the main welding (so-called welding process) executed by the corresponding main welding robots MC1a, MC1b, and so on via each of the plurality of robot control devices 2a, 2b, and so on. For example, the host device 1 reads, from the external storage ST, welding-related information input or set in advance by the user (for example, a welding operator or a system administrator. The same applies hereinafter), generates a welding process execution command including a part of contents of the welding-related information based on the welding-related information, and transmits the generated execution command to the corresponding robot control device (for example, the robot control device 2a). The execution command of the main welding described above is not limited to being generated by the host device 1, and may be generated by, for example, an operation panel (for example, a programmable logic controller (PLC)) of equipment in a factory or the like in which the main welding is performed, or an operation panel (for example, a teach Pendant (TP)) of the robot control devices 2a, 2b, and so on. The teach pendant (TP) is a device for operating the main welding robots MC1a, MC1b, and so on connected to the robot control devices 2a, 2b, and so on.

Here, the welding-related information is information indicating the content of the welding process executed for each main welding robot, and is created in advance for each welding process and registered in the external storage ST. The welding-related information includes, for example, the number of original workpieces required for the welding process, an identifier (hereinafter, abbreviated as "ID") of the original workpiece used in the welding process, workpiece information including a name and a welding portion of the original workpiece, an execution scheduled date on which the welding process is scheduled to be executed, the number of welded workpieces, and various welding conditions at the time of the welding process. The welding-related information is not limited to data of items described above. The robot control device (for example, the robot control device 2a) causes the main welding robot (for example, the main welding robot MC1a) to perform the welding process using the plurality of original workpieces designated by the execution command based on the execution command transmitted from the host device 1. In the present specification, the type of the welding process is not limited, but in order to make the description easy to understand, a process of joining each of the plurality of original workpieces will be described as an example (see FIGS. 3 and 4).

The host device 1 is connected to the monitor MN1, the input interface UI1, and the external storage ST so as to be able to input and output data, and is further connected to each of the plurality of robot control devices 2a, 2b, and so on so as to be able to communicate data. The host device 1 may include a terminal device P1 integrally including the monitor MN1 and the input interface UI1, and may further integrally include the external storage ST. In this case, the terminal device P1 is a personal computer (PC) used by a user prior to execution of a welding process (for example, main welding). The terminal device P1 is not limited to the PC described above, and may be a computer device having a communication function, such as a smartphone or a tablet terminal.

The host device 1 acquires the above-described welding-related information from the external storage ST, generates the welding process execution command using the plurality of original workpieces based on the welding-related information, and transmits the execution command to the corresponding robot control devices 2a, 2b, and so on. When the host device 1 receives the ID of a welded workpiece (for example, a secondary workpiece) from the corresponding robot control devices 2a, 2b, and so on after the completion of the welding process by each of the main welding robots MC1a, MC1b, and so on, the host device 1 sets the ID as the identifier (ID) of the welded workpiece, generates welding process logical data (see FIGS. 3 and 4) corresponding to the welded workpiece, and stores the welding process logical data in association with the ID of the welded workpiece in the external storage ST. Accordingly, the host device 1 can appropriately manage the IDs of the welded workpieces produced by the welding process by various main welding robots. Details of an operation of the host device 1 will be described later with reference to the drawings. The host device 1 may display the welding process logical data including the ID of the welded workpiece on the monitor MN1.

The monitor MN1 may be configured with a display device such as a liquid crystal display (LED) or an organic electroluminescence (EL). The monitor MN1 may display, for example, a screen indicating the welding process logical data including the ID of the welded workpiece, which is output from the host device 1. Instead of the monitor MN1 or together with the monitor MN1, a speaker (not shown) may be connected to the host device 1, and the host device 1 may output the contents of the welding process logical data by voice via the speaker.

The input interface UI1 is a user interface that detects an input operation of the user and outputs the input operation to the host device 1, and may be configured using, for example, a mouse, a keyboard, or a touch panel. The input interface UI1 receives, for example, an input operation when the user creates the welding-related information, or an input operation when a welding process execution command is transmitted to the robot control device 2a.

The external storage ST is configured using, for example, a hard disk drive (HDD) or a solid state drive (SSD). The external storage ST stores, for example, data of welding-related information created for each welding process, and welding process logical data (see FIGS. 3 and 4) including the ID of the welded workpiece produced by the welding process.

The robot control devices 2a, 2b, and so on are connected so as to be able to communicate data with the host device 1, and are connected so as to be able to communicate data with each of the main welding robots MC1a, MC1b, and so on. When the robot control devices 2a, 2b, and so on receive the welding process execution command sent from the host device 1, the robot control devices 2a, 2b, and so on control the corresponding main welding robots MC1a, MC1b, and so on based on the execution command to execute the welding process. When detecting the completion of the welding process, the robot control devices 2a, 2b, and so on generate a welding completion notification indicating the completion of the welding process and transmit the welding completion notification to the host device 1. Accordingly, the host device 1 can appropriately detect the completion of the welding process based on each of the robot control devices 2a, 2b, and so on.

The main welding robots MC1a, MC1b, and so on as an example of the welding robot are connected to the robot control devices 2a, 2b, and so on so as to be able to communicate data with the robot control devices 2a, 2b, and so on. The main welding robots MC1a, MC1b, and so on execute the welding process instructed by the host device 1 under the control of the corresponding robot control devices 2a, 2b, and so on.

Figure 2:
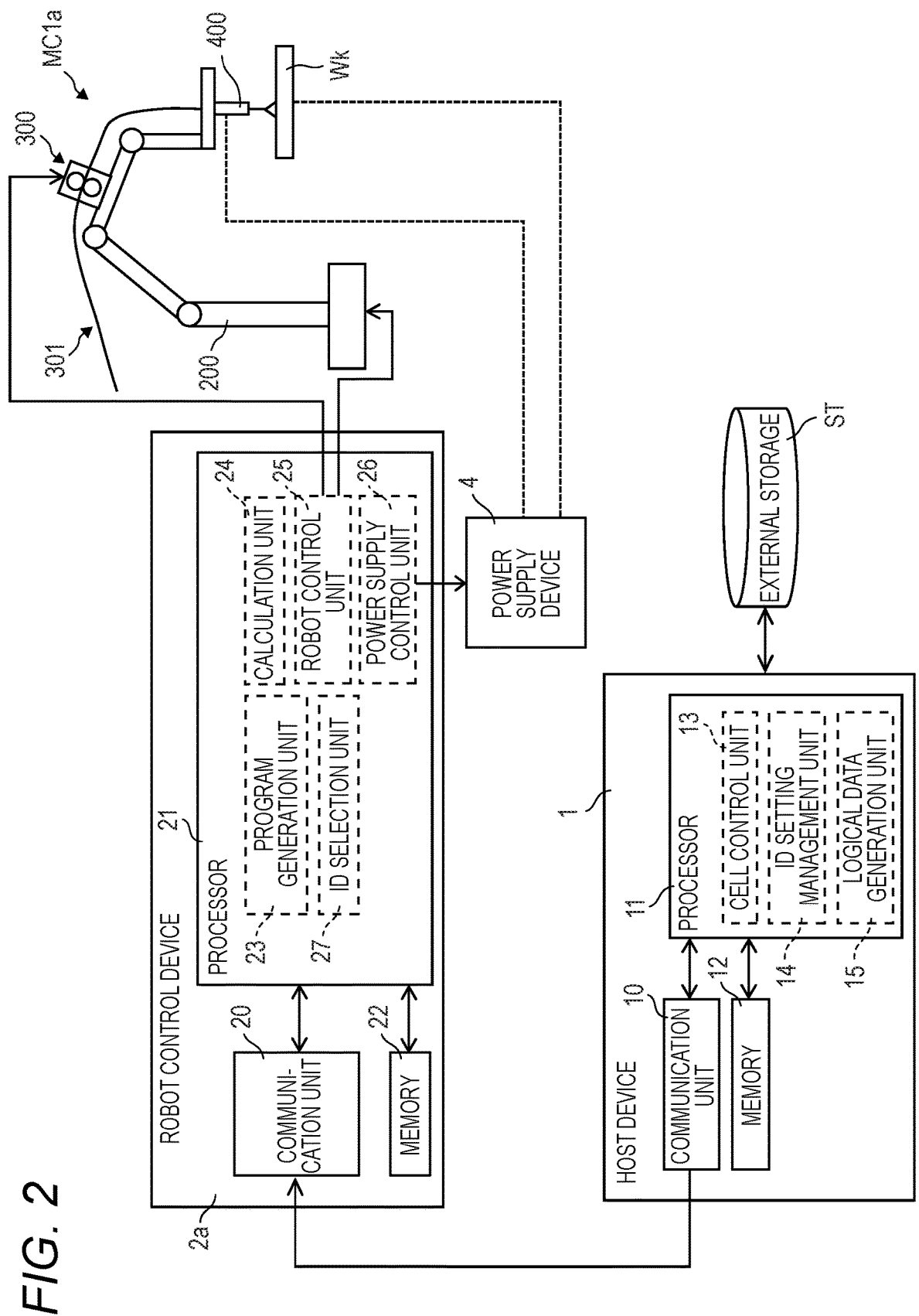
FIG. 2 is a diagram showing an internal configuration example of a robot control device and a host device according to the first embodiment.

FIG. 2 is a diagram showing an internal configuration example of the robot control device 2a and the host device 1 according to the first embodiment. In order to make the description easy to understand, the monitor MN1 and the input interface UI1 are not shown in FIG. 2, the main welding robot MC1a among the main welding robots MC1a, MC1b, and so on is exemplified, and further, the robot control device 2a among the robot control devices 2a, 2b, and so on is exemplified.

The main welding robot MC1a executes the welding process instructed from the host device 1 under the control of the robot control device 2a. The main welding robot MC1a performs, for example, arc welding in the welding process. However, the main welding robot MC1a may perform welding (for example, laser welding) other than the arc welding. In this case, although not shown, a laser head may be connected to a laser oscillator via an optical fiber instead of a welding torch 400. The main welding robot MC1a includes at least a manipulator 200, the wire feeding device 300, a welding wire 301, and the welding torch 400.

The manipulator 200 includes an articulated arm, and moves each arm based on a control signal from a robot control unit 25 (see the following description) of the robot control device 2a. Accordingly, the manipulator 200 can change a positional relationship between a workpiece Wk and the welding torch 400 (for example, an angle of the welding torch 400 with respect to the workpiece Wk) by the movement of the arm.

The wire feeding device 300 controls a feeding speed of the welding wire 301 based on a control signal (see the following description) from the robot control device 2a. The wire feeding device 300 may include a sensor capable of detecting a remaining amount of the welding wire 301.

The welding wire 301 is held by the welding torch 400. When electric power is supplied from a power supply device 4 to the welding torch 400, an arc is generated between a tip end of the welding wire 301 and the workpiece Wk, and the arc welding is performed. The illustration and description of a configuration and the like for supplying shielding gas to the welding torch 400 are omitted for the convenience of description.

The host device 1 generates the welding process execution command using each of the plurality of original workpieces by using the welding-related information input or set in advance by the user, and transmits the execution command to the robot control device 2a. The host device 1 includes at least a communication unit 10, a processor 11, and a memory 12.

The communication unit 10 is connected to the robot control device 2 and the external storage ST so that data can be communicated among the communication unit 10, the robot control device 2a, and the external storage ST. The communication unit 10 transmits a welding process execution command (see the above description) generated by the processor 11 to the robot control device 2a. The communication unit 10 receives the ID of the welded workpiece transmitted from the robot control device 2a and outputs the ID to the processor 11. The welding process execution command may include, for example, a control signal for controlling each of the manipulator 200, the wire feeding device 300, and the power supply device 4 included in the main welding robot MC1a.

The processor 11 is configured using, for example, a central processing unit (CPU) or a field programmable gate array (FPGA), and performs various processing and control in cooperation with the memory 12. Specifically, the processor 11 functionally implements a cell control unit 13, an ID setting management unit 14, and a logical data generation unit 15, and by referring to a program held in the memory 12 and executing the program.

The memory 12 includes, for example, a random access memory (RAM) as a workpiece memory used when processing of the processor 11 is executed, and a read only memory (ROM) for storing a program defining processing of the processor 11. The RAM temporarily stores data generated or acquired by the processor 11. A program that defines processing of the processor 11 is written into the ROM. The memory 12 stores the data of the welding-related information read from the external storage ST, data of secondary workpiece information (see the following description) including the ID of the welded workpiece (secondary workpiece) transmitted from the robot control device 2a, and the welding process logical data (see FIGS. 3 and 4) of the secondary workpiece generated by the processor 11.

The cell control unit 13 generates the execution command for executing the welding process using the plurality of original workpieces defined (in other words, set) in the welding-related information based on the welding-related information stored in the external storage ST. The cell control unit 13 may generate a different welding process execution command for each welding process executed by each of the main welding robots MC1a, MC1b, and so on. The welding process execution command generated by the cell control unit 13 is transmitted to the corresponding robot control devices 2a, 2b, and so on via the communication unit 10.

The ID setting management unit 14 sets the ID of the welded workpiece (secondary workpiece) transmitted from the robot control device (for example, the robot control device 2a) as the ID of the welded workpiece (secondary workpiece) produced by the welding process using the plurality of original workpieces, and stores the ID in the memory 12. The ID setting management unit 14 may store the ID of the welded workpiece (secondary workpiece) and the welding process logical data (see the following description) in association with each other in the external storage ST.

Figure 3:
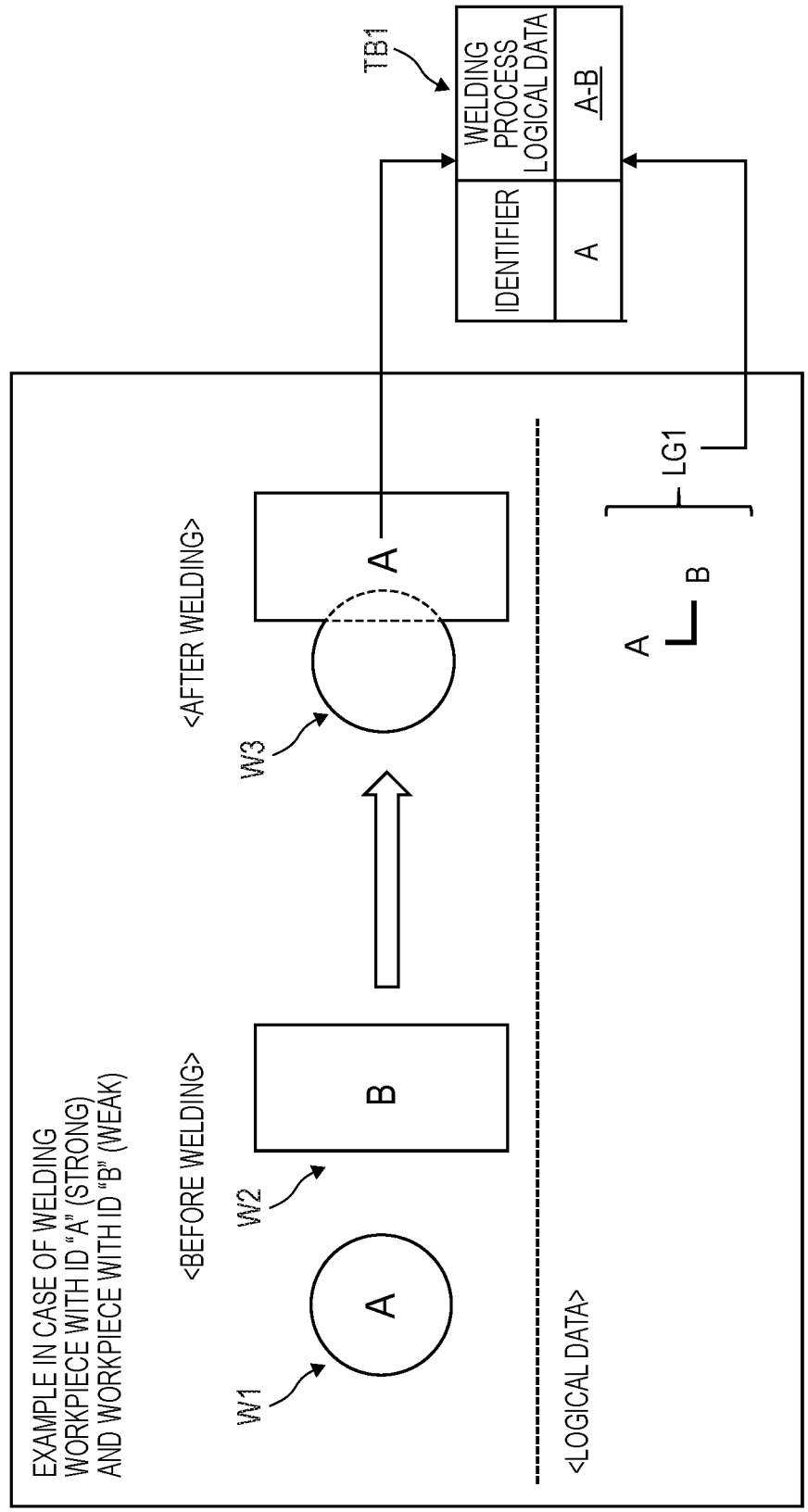
FIG. 3 is an explanatory diagram showing an example of an operation outline example at the time of welding using a workpiece with an ID "A" and a workpiece with an ID "B".
Figure 4:
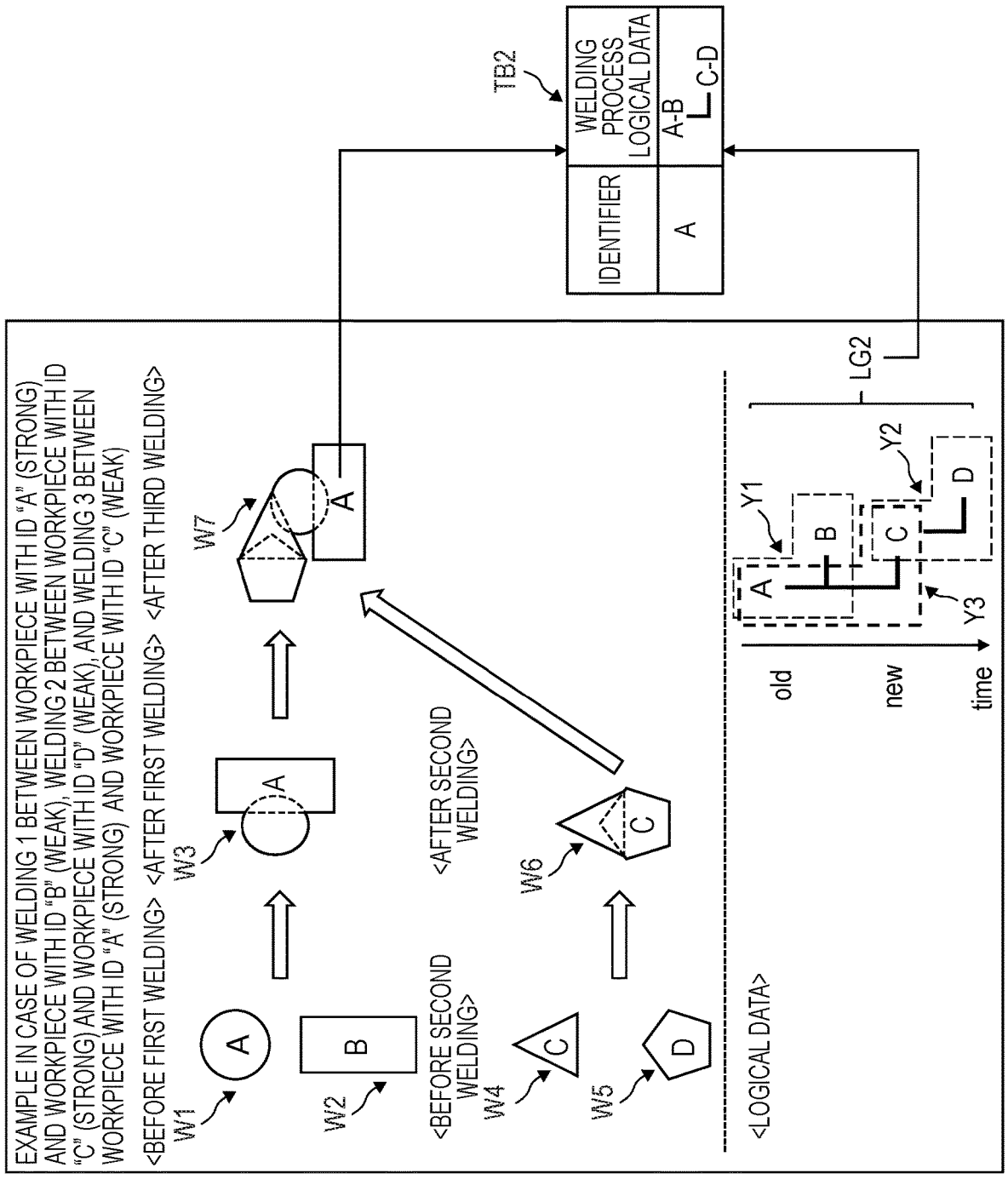
FIG. 4 explanatory diagram showing an example of the operation outline at the time of welding using the workpiece with the ID "A", the workpiece with the ID "B", a workpiece with an ID "C", and a workpiece with an ID "D".

The logical data generation unit 15 uses the secondary workpiece information including the ID of the welded workpiece (secondary workpiece) transmitted from the robot control device (for example, the robot control device 2a) to generate the welding process logical data indicating a relationship between the ID of the secondary workpiece and the ID of each of the plurality of original workpieces used in the welding process (for example, a strength relationship of the IDs) (see FIGS. 3 and 4). Details of the strength of the ID and the welding process logical data will be described later with reference to FIGS. 3 and 4. The logical data generation unit 15 may store the ID of the welded workpiece (secondary workpiece) and the welding process logical data in association with each other in the external storage ST.

The robot control device 2a controls the processing of the corresponding main welding robot MC1a (specifically, the manipulator 200, the wire feeding device 300, and the power supply device 4) based on the welding process execution command sent from the host device 1. The robot control device 2a includes at least a communication unit 20, a processor 21, and a memory 22.

The communication unit 20 is connected to enable data communication between the host device 1 and the main welding robot MC1a. Although illustration is simplified in FIG. 2, data is transmitted and received between the robot control unit 25 and the manipulator 200, between the robot control unit 25 and the wire feeding device 300, and between a power supply control unit 26 and the power supply device 4 via the communication unit 20. The communication unit 20 receives the welding process execution command transmitted from the host device 1. The communication unit 20 transmits the secondary workpiece information including the ID of the welded workpiece (the secondary workpiece) produced by the welding process to the host device 1.

Here, the secondary workpiece information includes, in addition to the ID of the welded workpiece (the secondary workpiece), at least workpiece information (for example, the ID and name of the original workpiece, the welding portion of the original workpiece) including the IDs of the plurality of original workpieces used in the welding process, and welding conditions at the time of execution of the welding process. The welding conditions include, for example, a material and a thickness of the original workpiece, a material and a wire diameter of the welding wire 301, a type of the shielding gas, a flow rate of the shielding gas, a set average value of a welding current, a set average value of a welding voltage, a feeding speed and a feeding amount of the welding wire 301, the number of times of welding, and a welding time. In addition to these, for example, information indicating a type of welding process (for example, TIG welding, MAG welding, or pulse welding), and a moving speed and a moving time of the manipulator 200 may be included.

The processor 21 is configured with, for example, a CPU or an FPGA, and executes various processing and controls in cooperation with the memory 22. Specifically, the processor 21 functionally implements a program generation unit 23, a calculation unit 24, the robot control unit 25, the power supply control unit 26, and an ID selection unit 27 by referring to a program held in the memory 22 and executing the program.

The memory 22 includes, for example, a RAM as a workpiece memory used when the processing of the processor 21 is executed, and a ROM that stores a program defining the processing of the processor 21. The RAM temporarily stores data generated or acquired by the processor 21. The program that defines processing of the processor 21 is written in the ROM. The memory 22 stores data of the welding process execution command transmitted from the host device 1, data of secondary workpiece information including the ID of the welded workpiece (the secondary workpiece) generated by the welding process, and data of welding process logical data (see FIGS. 3 and 4) of the secondary workpiece generated by the processor 21. The memory 22 stores a welding process program executed by the main welding robots MC1a, MC1b, and so on. The welding process program is a program that defines a specific procedure (process) of the welding process of joining the plurality of original workpieces using the welding conditions in the welding process. The program may be created in the robot control device 2a, or may be created by the host device 1, transmitted in advance, and stored in the robot control device 2a.

The program generation unit 23 generates a welding process program to be executed by the main welding robot (for example, the main welding robot MC1a) using the workpiece information (for example, the ID, the name, and the welding portion of the original workpiece) of each of the plurality of original workpieces included in the execution command based on the welding process execution command transmitted from the host device 1 via the communication unit 20. The program may include various parameters such as the welding current, the welding voltage, an offset amount, a welding speed, and a posture of the welding torch 400 for controlling the power supply device 4, the manipulator 200, the wire feeding device 300, the welding torch 400, and the like during the execution of the welding process. The generated program may be stored in the processor 21 or may be stored in the RAM in the memory 22.

The calculation unit 24 performs various calculations. For example, the calculation unit 24 performs calculation or the like for controlling the main welding robot MC1a (specifically, each of the manipulator 200, the wire feeding device 300, and the power supply device 4) controlled by the robot control unit 25 based on a welding process program generated by the program generation unit 23.

The robot control unit 25 drives the main welding robot MC1a (specifically, each of the manipulator 200, the wire feeding device 300, and the power supply device 4) based on the welding process program generated by the program generation unit 23.

The power supply control unit 26 drives the power supply device 4 based on the welding process program generated by the program generation unit 23 and a calculation result of the calculation unit 24.

After the welding process using the plurality of original workpieces is completed, the ID selection unit 27 selects and determines which ID among the IDs of the plurality of original workpieces is to be adopted as the ID of the welded workpiece (secondary workpiece) according to a predetermined rule. Here, the ID and the predetermined rule will be described with reference to FIG. 5. FIG. 5 is a diagram showing an example of an ID strength rule.

In the present specification, the ID is constituted by, for example, a combination of a plurality of types of character codes. The types are, for example, alphabets and numbers, and are not limited thereto. As shown in FIG. 5, "ABC001XYZ999" as the ID of the original workpiece will be described as an example. As rules indicating the ID strength (that is, the ID is strong and the ID is weak), the following two strength rules are defined in the first embodiment.

In a first strength rule, the ID selection unit 27 sets a division between an alphabet and a number for the ID of the original workpiece, and compares the strength of each part of the division. In a second strength rule, the ID selection unit 27 determines that, in one division between the alphabet or the number, the strength is stronger as the order of the alphabets is earlier and the strength is stronger as the number is larger. For example, it is determined that "A" is stronger than "B" in the alphabet and "2" is stronger than "1" in the number.

As a modification of the second strength rule, the ID selection unit 27 may determine that, in one division between the alphabet or the number, the strength is stronger as the order of the alphabets is later and the strength is stronger as the number is smaller. For example, it may be determined that "B" is stronger than "A" in the alphabet and "1" is stronger than "2" in the number.

Here, "ABC001XYZ999" and "ABD002XYW998" are shown as the IDs of the original workpieces to be compared. For example, the ID selection unit 27 provides divisions "ABC", "001", "XYZ", and "999" for the ID "ABC001XYZ999", and similarly provides divisions "ABD", "002", "XYW", and "998" for the ID "ABD002XYW998".

For example, the ID selection unit 27 compares the IDs of the segment parts provided in order from upper digits of the ID at any time, and determines that "ABC" is stronger than "ABD", "001" is weaker than "002", "XYZ" is weaker than "XYW", and "999" is stronger than "998". Furthermore, the ID selection unit 27 gives priority to the one with the stronger ID in the division of the upper digits and determines that the ID as a whole is strong. This is because, for example, the "alphabet" used in the upper digit of the ID does not often define the type of the original workpiece. Therefore, the ID selection unit 27 determines that the ID "ABC001XYZ999" is stronger than the ID "ABD002XYW998". The above described strength rule is merely an example, and is not limited to the above described example, and it is needless to say that a rule for determining the ID strength may be provided.

FIG. 3 is an explanatory diagram showing an example of an operation outline at the time of welding using a workpiece with an ID "A" and a workpiece with an ID "B". In the example of FIG. 3, a process in which a welded workpiece (that is, a secondary workpiece W3) is manufactured by joining a circular original workpiece W1 having the ID "A" and a square original workpiece W2 having the ID "B" in one welding process is shown. As described with reference to FIG. 5, the IDs "A" and "B" are, for example, 12-digit alphabets and numerals, but are collectively represented by one alphabetic character in order to make the description of FIG. 3 easy to understand.

In FIG. 3, it is assumed that the ID selection unit 27 determines that the ID "A" is stronger than the ID "B". In this case, the ID selection unit 27 adopts and selects the stronger ID "A" as it is (that is, without changing) as the ID of the welded workpiece (that is, the secondary workpiece W3). However, when the ID "A" of the original workpiece W1 and the ID "A" of the welded workpiece (that is, the secondary workpiece W3) are the same, it may be complicated to manage whether the ID "A" is the ID of the original workpiece W1 or the secondary workpiece W3. Therefore, in the welding system 100 according to the first embodiment, for example, in the welding process using the original workpiece W1 of the ID "A" and the original workpiece W2 of the ID "B", the host device 1 generates welding process logical data LG1 that logically indicates a mutual relationship between the strong ID "A", the weak ID "B", and the ID "A" of the secondary workpiece W3, generates a record TB1 in which the ID "A" of the secondary workpiece W3 and the welding process logical data LG1 are associated with each other, and stores the record TB1 in the external storage ST (see FIG. 3). The host device 1 may display the ID "A" of the secondary workpiece W3 and the welding process logical data LG1 on the monitor MN1. Accordingly, the user can intuitively grasp details of the welding process that reaches the manufacture of the secondary workpiece W3.

The welding process logical data LG1 is data having a logical structure in which the ID "A" is located at a higher level and the ID "B" is located at a lower level than the ID "A". That is, the welding process logical data LG1 indicates, as viewed from the ID "A" of the secondary workpiece W3, which ID the original workpiece having is used and the secondary workpiece W3 is manufactured by the welding process, and also indicates an ID strength relationship of the plurality of original workpieces used in the welding process and a temporal order in which the welding processes are executed when the plurality of welding processes exist. Accordingly, even after the welding process is completed, the user can comprehensively grasp the data on the original workpieces used for manufacturing the secondary workpiece W3 without losing the information on the original workpiece W2 having a weak ID.

Although not shown in FIG. 3, when three original workpieces of the original workpiece of the ID "A", the original workpiece of the ID "B", and the original workpiece of the ID "C" are joined or the like and the ID "A" is the strongest, the host device 1 may generate data having a logical structure in which, for example, the ID "A" is located at a highest position and the ID "B" and the ID "C" are located lower than the ID "A" as the welding process logical data.

FIG. 4 is an explanatory diagram showing an example of an operation outline at the time of welding using the workpiece with the ID "A", the workpiece with the ID "B", the workpiece with the ID "C", and the workpiece with the ID "D". The example of FIG. 4 shows a process in which a welded workpiece (that is, the secondary workpiece W3) is manufactured by joining a circular original workpiece W1 having the ID "A" and a square original workpiece W2 having the ID "B" in a first welding process, a welded workpiece (that is, a secondary workpiece W6) is manufactured by joining a triangular original workpiece W4 having the ID "C" and a pentagonal original workpiece W5 having an ID "D" in a second welding process, and further, a welded workpiece (that is, a tertiary workpiece W7) is manufactured by joining a secondary workpiece W3 having the ID "A" and a secondary workpiece W6 having the ID "C" in a third welding process. As described with reference to FIG. 5, the IDs "A", "B", "C", and "D" are, for example, 12-digit alphabets and numerals, but are collectively represented by one alphabetic character in order to make the description of FIG. 4 easy to understand.

In FIG. 4, it is assumed that the ID selection unit 27 determines that the ID "A" is stronger than the ID "B". In this case, the ID selection unit 27 adopts and selects the stronger ID "A" as it is (that is, without changing) as the ID of the welded workpiece (that is, the secondary workpiece W3) which is a product of the first welding process. Similarly, it is assumed that the ID selection unit 27 determines that the ID "C" is stronger than the ID "D". In this case, the ID selection unit 27 adopts and selects the stronger ID "C" as it is (that is, without changing) as the ID of the welded workpiece (that is, the secondary workpiece W6) which is a product of the second welding process. Furthermore, it is assumed that the ID selection unit 27 determines that the ID "A" is stronger than the ID "C". In this case, the ID selection unit 27 adopts and selects the stronger ID "A" as it is (that is, without changing) as the ID of the welded workpiece (that is, the tertiary workpiece W7) which is the product of the third welding process. However, if the ID "A" of the original workpiece W1, the ID "A" of the welded workpiece (that is, the secondary workpiece W3), and the ID "A" of the tertiary workpiece W7 are all the same, it may be complicated to manage which ID "A" is the original workpiece W1, the secondary workpiece W3, or the tertiary workpiece W7. Therefore, in the welding system 100 according to the first embodiment, for example, in the first welding process to the third welding process, the host device 1 generates welding process logical data LG2 that logically indicates the mutual relationship between the strongest ID "A" and the other weak IDs "B", "C", and "D", generates the record TB2 in which the ID "A" of the tertiary workpiece W7 and the welding process logical data LG2 are associated with each other, and stores the record TB2 in the external storage ST (see FIG. 4).

The welding process logical data LG2 indicates, when viewed from the ID "A" of the tertiary workpiece W7, which ID the original workpiece having which ID is used in which the welding process the tertiary workpiece W7 is used and manufactured, and also indicates an ID strength relationship of the plurality of original workpieces used in each welding processes, and a temporal order in which each process is executed. For example, the welding process logical data LG2 indicates that the tertiary workpiece W7 having the ID "A" is manufactured through three welding processes (welding processes Y1, Y2, and Y3). In the welding process Y1, the original workpiece W1 having the ID "A" and the original workpiece W2 having the ID "B" are welded to each other, and since the ID "A" is stronger than the ID "B", the ID "A" is selected as the ID of the secondary workpiece W3. In the welding process Y2, the original workpiece W4 having the ID "C" and the original workpiece W5 having the ID "D" are welded to each other, and since the ID "C" is stronger than the ID "D", the ID "C" is selected as the ID of the secondary workpiece W6. In the welding process Y3, the secondary workpiece W3 having the ID "A" and the secondary workpiece W6 having the ID "C" are welded to each other, and since the ID "A" is stronger, the ID "A" is selected as the ID of the tertiary workpiece W7. In the welding process logical data LG2, when viewed from the ID "A" of the tertiary workpiece W7, a position closer to the ID "A" indicates that a time at which the original workpiece W1 or the secondary workpiece W3 having the ID "A" is welded is older, and a position farther from the ID "A" indicates that the time at which the original workpiece W1 or the secondary workpiece W3 having the ID "A" is welded is newer. Accordingly, even after all of the plurality of welding processes are completed, the user can comprehensively grasp the data related to each original workpiece used for manufacturing the tertiary workpiece W7 without losing the information on the original workpiece or the secondary workpiece having a weak ID in each welding process.

Figure 6B:
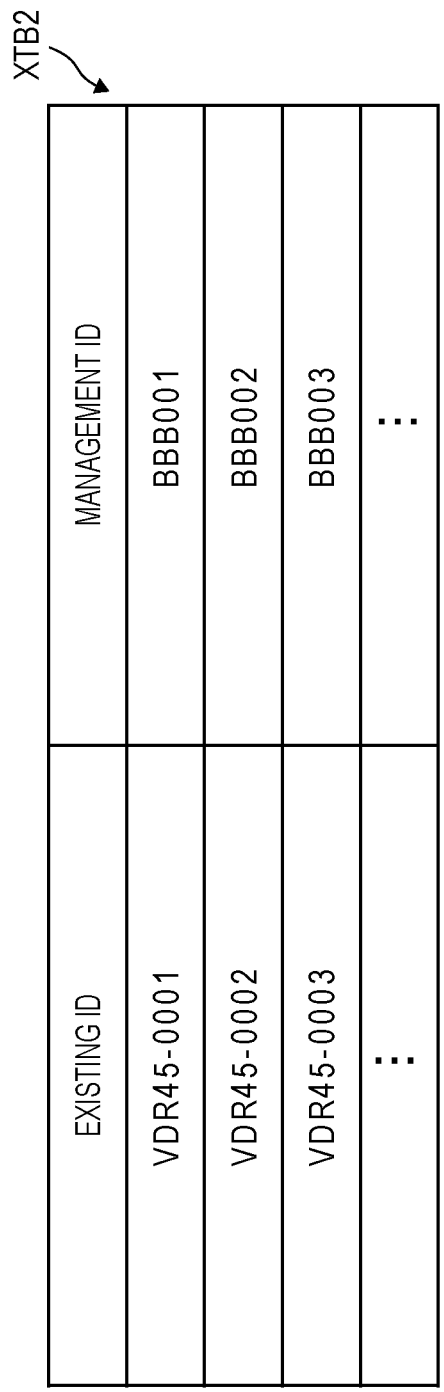
FIG. 6B is a diagram showing an example of the correspondence table between the existing IDs and the management IDs.

FIGS. 6A and 6B are diagrams showing an example of a correspondence table between an existing ID and a management ID. When a business operator (hereinafter, referred to as the "user business operator") who executes the welding process starts the welding process, an original workpiece such as a steel material used in the welding process may be supplied (in other words, may be outsourced) from the supplier in advance. For this reason, when the user business operator outsources the original workpiece such as the steel material, an ID is often assigned to the original workpiece in advance at an outsource destination. In the following description, the ID of the original workpiece assigned in advance in the outsource destination as described above is referred to as a "existing ID". When the supplied original workpiece is assigned an existing ID unique to the outsource destination, the use of the existing ID may not be suitable in terms of the management of the user business operator.

Therefore, as shown in FIGS. 6A or 6B, in the welding system 100 according to the first embodiment, when the existing ID is assigned to each of one or more original workpieces to be supplied from the outsource destination, a correspondence table XTB1 and XTB2 (an example of the management table) indicating a relationship between the existing ID and the management ID of the user business operator is created by the user and stored in the external storage ST. The correspondence tables XTB1 and XTB2 may be stored in the memory 12 of the host device 1.

For example, in the correspondence table XTB1 of FIG. 6A, it is assumed that the user business operator supplies a plurality of original workpieces of the same type (for example, the same material supplied from the same supplier) from the outsource destination, and the management IDs "AAA001", "AAA002", "AAA003", and the like corresponding to the existing IDs "RR70-001", "RR70-002", "RR70-003", and the like unique to the outsource destination are defined. "RR70-001", "RR70-002", "RR70-003", and so on are of the same type because "RR70" before the hyphen in the ID is common, and are different from each other in branch number of "RR70" (number after the hyphen in the ID), so that the original workpieces (parts) are different.

For example, in the correspondence table XTB2 of FIG. 6B, it is assumed that the user business operator supplies a plurality of original workpieces of the same type (for example, the same material supplied from the same supplier) from the outsource destination, and the management IDs "BBB001", "BBB002", "BBB003", and the like corresponding to the existing IDs "VDR45-001", "VDR45-002", "VDR45-003", and the like unique to the outsource destination are defined. "VDR45-001", "VDR45-002", "VDR45-003", and so on are of the same type because "VDR45" before the hyphen in the ID is common, and are different from each other in the branch number of "VDR45" (number after the hyphen in the ID), so that the original workpieces (parts) are different.

Figure 7:
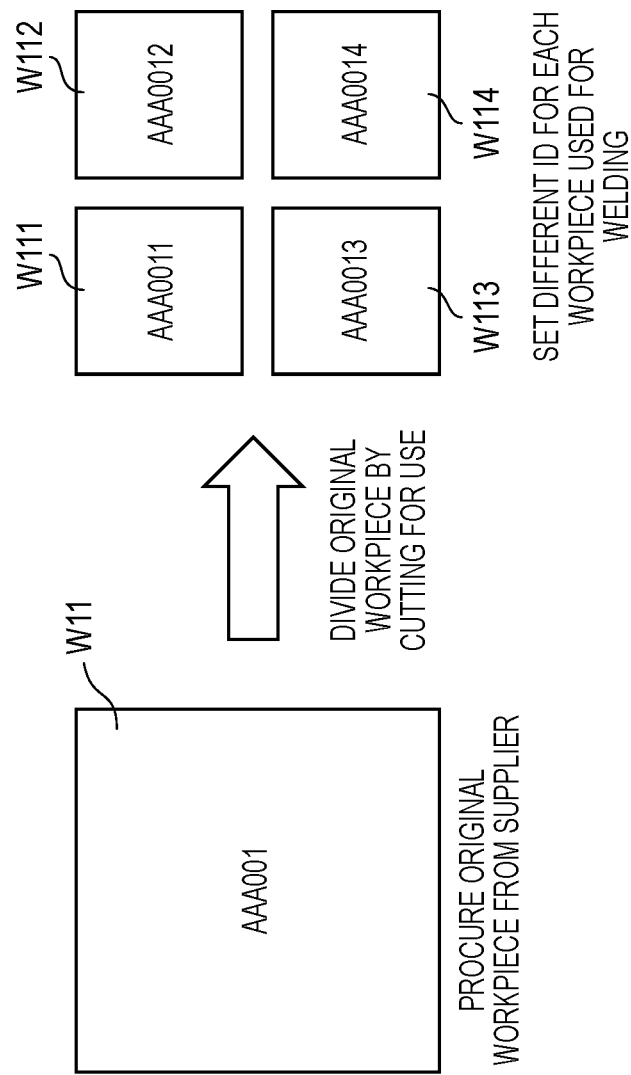
FIG. 7 is a diagram showing an example in which different IDs are assigned to a plurality of original workpieces generated by division.

FIG. 7 is a diagram showing an example in which different IDs are assigned to a plurality of original workpieces W111, W112, W113, and W114 generated by division. As described above, the user business operator may supply (procure) an original workpiece W11 from the supplier. It is assumed that the management ID of the user business operator of the original workpiece W11 is "AAA001". In the welding process, the original workpiece W11 may not be used as it is, but may be divided into, for example, four steel materials. In such a case, the welding system 100 may set different IDs in the host device 1 so as to have relevance to the ID of a parent original workpiece W11 with respect to each of the four original workpieces W111, W112, W113, and W114, which are steel materials, by an input operation performed by the user via an input interface U1.

Specifically, the host device 1 sets the ID of the original workpiece W111 to "AAA0011", the ID of the original workpiece W112 to "AAA0012", the ID of the original workpiece W113 to "AAA0013", and the ID of the original workpiece W114 to "AAA0014". Accordingly, since the welding system 100 can set the ID in the state of the original workpiece suitable for a size, a shape, and the like actually used in the welding process, the identifier of the welded workpiece and the welding process logical data can be correctly generated.

(Operation of Welding System)

Figure 8:
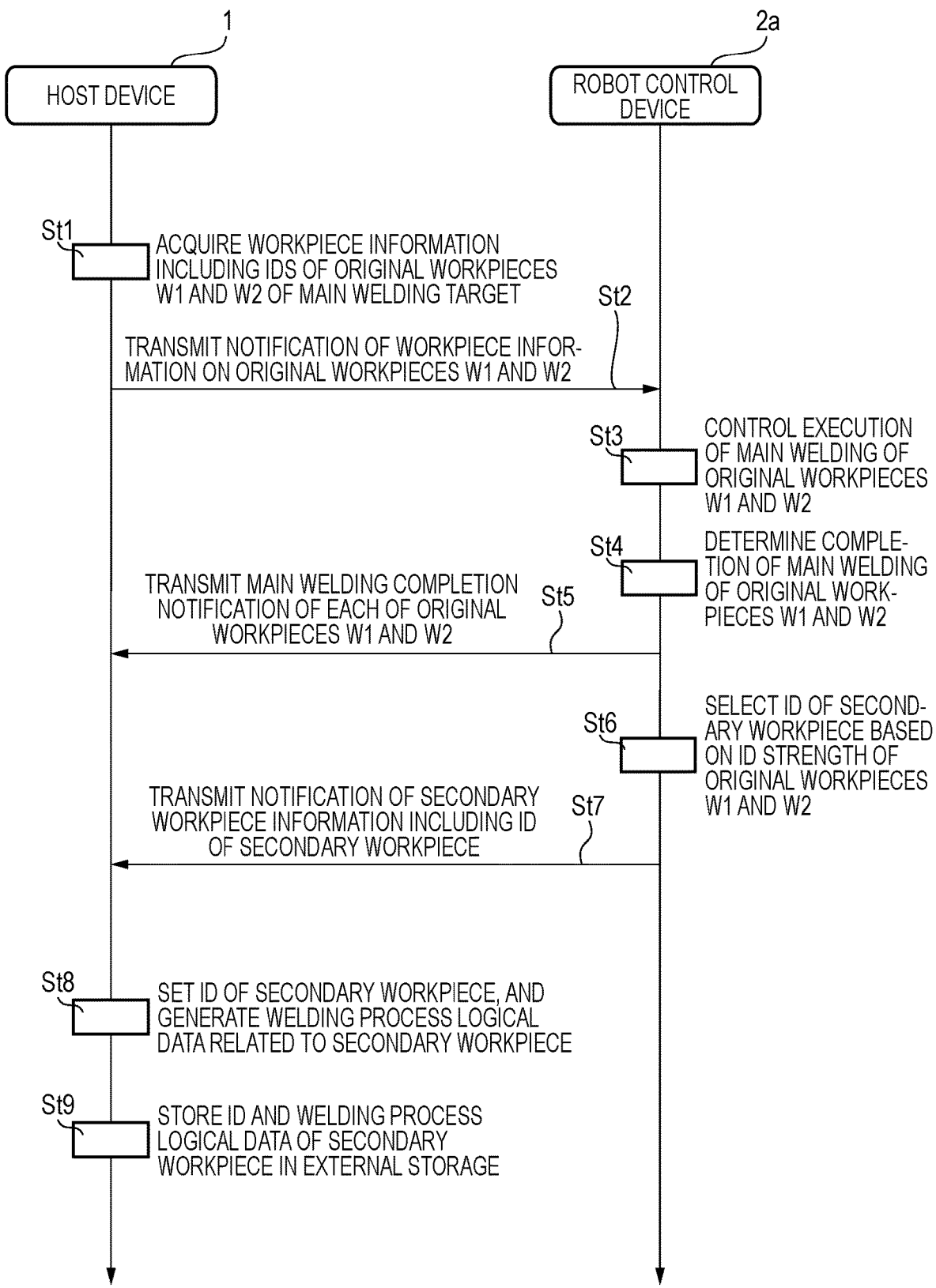
FIG. 8 is a sequence diagram showing an example of an operation procedure of ID management in the welding system according to the first embodiment.

Next, an operation procedure of the ID management by the welding system 100 according to the first embodiment will be described with reference to FIG. 8. FIG. 8 is a sequence diagram showing an operation procedure example of the ID management in the welding system 100 according to the first embodiment. In the description of FIG. 8, an operation procedure performed between the host device 1 and the robot control device 2a in the welding process using the original workpieces W1 and W2 shown in FIG. 3 will be described as an example.

In FIG. 8, the host device 1 acquires workpiece information (for example, the ID, the name, and the welding portion of the original workpiece) including the IDs of the original workpieces W1 and W2 which are targets of the welding process (main welding) (St1), and generates a welding process execution command including the workpiece information on the original workpieces W1 and W2. The host device 1 sends the welding process execution command including the workpiece information on the original workpiece W1 and the workpiece information on the original workpiece W2 to the robot control device 2 (St2).

When the robot control device 2a receives the welding process execution command sent from the host device 1, the robot control device 2a generates a welding process program to be executed by the main welding robot MC1a using the workpiece information on each of the plurality of original workpieces W1 and W2 included in the execution command, and causes the main welding robot MC1a to execute the main welding according to the program (St3). The robot control device 2a determines the completion of the main welding (welding process) by the main welding robot MC1a by various known methods (St4), generates a main welding completion notification indicating that the main welding of each of the original workpieces W1 and W2 is individually completed, and sends the main welding completion notification to the host device 1 (St5).

After the main welding is completed, the robot control device 2a selects which ID of the original workpieces W1 and W2 is to be adopted as the ID of the secondary workpiece W3 according to the predetermined rule (see FIG. 5) based on the ID strength of the original workpieces W1 and W2 (St6). For example, it is assumed that the ID "A" of the original workpiece W1 is selected. The robot control device 2a sends the secondary workpiece information (for example, the workpiece information (for example, the ID of the original workpiece, the name, and the welding portion of the original workpiece) including the ID "A" of the secondary workpiece W3, the ID of each of the plurality of original workpieces W1 and W2 used in the welding process and the welding condition at the time of execution of the welding process) including the ID of the secondary workpiece W3 selected in step St6 to the host device 1 (St7).

When the host device 1 receives the secondary workpiece information including the ID of the secondary workpiece W3 transmitted from the robot control device 2a, the host device 1 sets the ID "A" selected by the robot control device 2a as the ID "A" of the secondary workpiece W3, and generates the welding process logical data (see FIGS. 3 and 4) related to the secondary workpiece W3 (St8). The host device 1 stores the ID "A" of the secondary workpiece W3 and the welding process logical data related to the secondary workpiece W3 in association with each other in the external storage ST (St9).

As described above, in the welding system 100 according to the first embodiment, the host device 1 acquires information on the ID of each of the plurality of original workpieces W1 and W2 used in the welding process. The robot control device 2a selects which of the IDs of the plurality of original workpieces W1 and W2 is to be adopted according to the predetermined rule based on completion of execution of the welding process using the plurality of original workpieces W1 and W2 by the main welding robot MC1a (a part of the welding system 100). The host device 1 sets the ID of any of the original workpieces selected by the robot control device 2a as the ID of the welded workpiece (for example, the secondary workpiece) generated by the welding process.

Accordingly, the welding system 100 according to the first embodiment can support efficient management of the IDs of workpieces (in other words, welded workpieces) manufactured in the welding process in which the plurality of original workpieces are joined or the like. That is, as in JP-A-2017-102548 in the related art, a new ID is not set every time one workpiece is located in a different manufacturing machine (in other words, the main welding robot), and the ID of the manufactured welded workpiece is one of the IDs of the plurality of original workpieces used in the welding process, so that the management of the ID by the user is simplified without increasing the ID uselessly.

The ID includes a combination of a plurality of character codes (for example, "AAA001"). The predetermined rule is to adopt an identifier having a strong character code based on a comparison of the strength of each character code constituting the ID of each of the plurality of original workpieces in accordance with the strength rule defined for each type of character code. Accordingly, the robot control device 2a can easily select and determine the ID of the welded workpiece (for example, the secondary workpiece) by simply determining which one of the IDs of the plurality of original workpieces is stronger in accordance with the predetermined ID strength rule.

The character code includes, for example, alphabets and numbers. In the selection of the ID of any of the original workpieces adopted as the ID of the welded workpiece, the robot control device 2a sets the respective IDs of the plurality of original workpieces with alphabets and numbers in order from the upper digit, determines that the IDs are strong when the alphabets are first in order or the numbers are large for each of the divisions, and selects the identifier of any of the original workpieces based on a determination result of the strength of each of the divisions. Accordingly, the robot control device 2a can simplify the comparison of the ID strength formed of most alphabets and numerals, and thus can easily generalize the processing of selecting the ID of the welded workpiece.

The character code includes, for example, alphabets and numbers. In the selection of the ID of any of the original workpieces adopted as the ID of the welded workpiece, the robot control device 2a sets the respective IDs of the plurality of original workpieces with alphabets and numbers in order from the upper digit, determines that the IDs are strong when the alphabets are later in order or when the numbers are smaller for each of the divisions, and selects the identifier of any of the original workpieces based on a determination result of the strength of each of the divisions. Accordingly, the robot control device 2a can simplify the comparison of the ID strength formed of most alphabets and numerals, and thus can easily generalize the processing of selecting the ID of the welded workpiece.

The host device 1 generates and stores data (for example, welding process logical data) indicating a relationship between the ID of the welded workpiece (for example, the secondary workpiece) and the ID of each of the plurality of original workpieces used in the welding process. Accordingly, even after the welding process is completed, the user can comprehensively grasp the data on the original workpieces used for manufacturing the secondary workpiece without losing the information on the original workpiece having a weak ID.

The data (for example, the welding process logical data) indicates the temporal order of each of the plurality of welding processes when the welding process includes the plurality of welding processes (see FIG. 4). Accordingly, the user can intuitively grasp, from the ID of the secondary workpiece, which original workpiece having which ID is used and which welding process is performed in which time series order the secondary workpiece is manufactured.

The data (for example, the welding process logical data) includes welding conditions of the welding process. Accordingly, the user can intuitively grasp what welding condition the welding process is executed.

When an existing unique identifier (for example, an existing ID) is set for at least one of the plurality of original workpieces, the welding system 100 holds, in the external storage ST, a management table (for example, the correspondence tables XTB1 and XTB2) in which the unique identifier and a management identifier (for example, the management ID) related to the welding process of the at least one original workpiece are associated with each other. In the selection of the ID of any original workpiece adopted as the ID of the welded workpiece, the robot control device 2a selects the ID of any original workpiece among the management identifier corresponding to the unique identifier of at least one original workpiece and the IDs of the original workpieces other than the at least one original workpiece. Accordingly, even when the original workpiece supplied from the outsource destination by the user business operator is assigned the unique existing ID, the welding system 100 can use the management ID unique to the user business operator corresponding to the existing ID, and thus can appropriately manage the ID of the welded workpiece.

The robot control device (for example, the robot control device 2a) constituting the welding system 100 includes a memory 22 that holds information on the ID of each of the plurality of original workpieces, a processor 21 that controls the main welding robot (for example, the main welding robot MC1a) so as to be able to execute the welding process using the plurality of original workpieces, and a communication unit 20 that communicates with the host device 1 that comprehensively controls the welding system 100. Based on the completion of the execution of the welding process by the main welding robot, the processor 21 selects which of the IDs of the plurality of original workpieces is to be adopted according to the predetermined rule. The processor 21 transmits a setting request in which the ID of any of the selected original workpieces is set as the ID of the welded workpiece generated by the welding process to the host device 1 via the communication unit 20.

Accordingly, the robot control device (for example, the robot control device 2a) according to the first embodiment can support efficient management of the IDs of workpieces (in other words, welded workpieces) manufactured in the welding process in which the plurality of original workpieces are joined or the like. That is, as in JP-A-2017-102548 in the related art, a new ID is not set every time one workpiece is located in a different manufacturing machine (in other words, the main welding robot), and the ID of the manufactured welded workpiece is one of the IDs of the plurality of original workpieces used in the welding process by the robot control device (for example, the robot control device 2a) according to the first embodiment, so that the management of the ID by the user is simplified without increasing the ID uselessly.

Second Embodiment

In the first embodiment, the ID of the welded workpiece (for example, the secondary workpiece) generated in the welding process is selected by the robot control device (for example, the robot control device 2a). In the second embodiment, an example in which the selection is performed by the host device 1 will be described.
(Configuration of Welding System)

Figure 9:
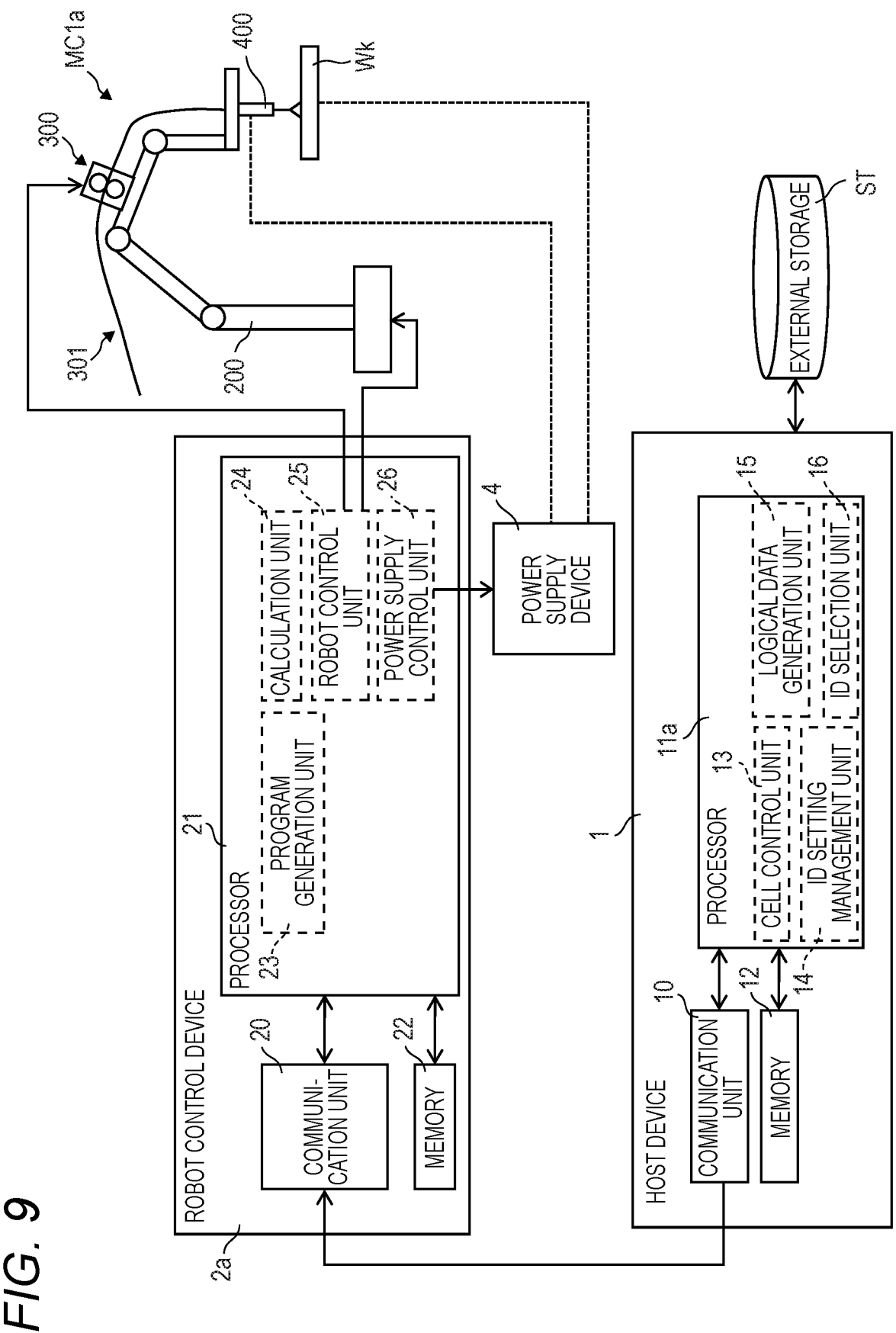
FIG. 9 is a diagram showing an internal configuration example of a robot control device and a host device according to a second embodiment.

FIG. 9 is a diagram showing an internal configuration example of the robot control device 2a and a host device 1a according to the second embodiment. In the description of FIG. 9, the same components as those shown in FIG. 2 are denoted by the same reference numerals, description thereof will be simplified or omitted, and different contents will be described.

The host device 1a generates a welding process execution command using each of the plurality of original workpieces by using the welding-related information input or set in advance by the user, and transmits the execution command to the robot control device 2a. The host device 1a includes at least the communication unit 10, a processor 11a, and the memory 12.

The processor 11a is configured with, for example, a CPU or an FPGA, and executes various processing and controls in cooperation with the memory 12. Specifically, the processor 11a functionally implements a cell control unit 13, an ID setting management unit 14, a logical data generation unit 15, and an ID selection unit 16 by referring to a program held in the memory 12 and executing the program. In other words, in the second embodiment, the ID selection unit 27 included in the processor 21 of the robot control devices 2a, 2b, and so on according to the first embodiment is included in the processor 11a of the host device 1a.

After the welding process using the plurality of original workpieces is completed by the main welding robot (for example, the main welding robot MC1a), the ID selection unit 16 selects and determines which ID among the IDs of the plurality of original workpieces is to be adopted as the ID of the welded workpiece (secondary workpiece) according to a predetermined rule using the data transmitted from the robot control device (for example, the robot control device 2a).
(Operation of Welding System)

Figure 10:
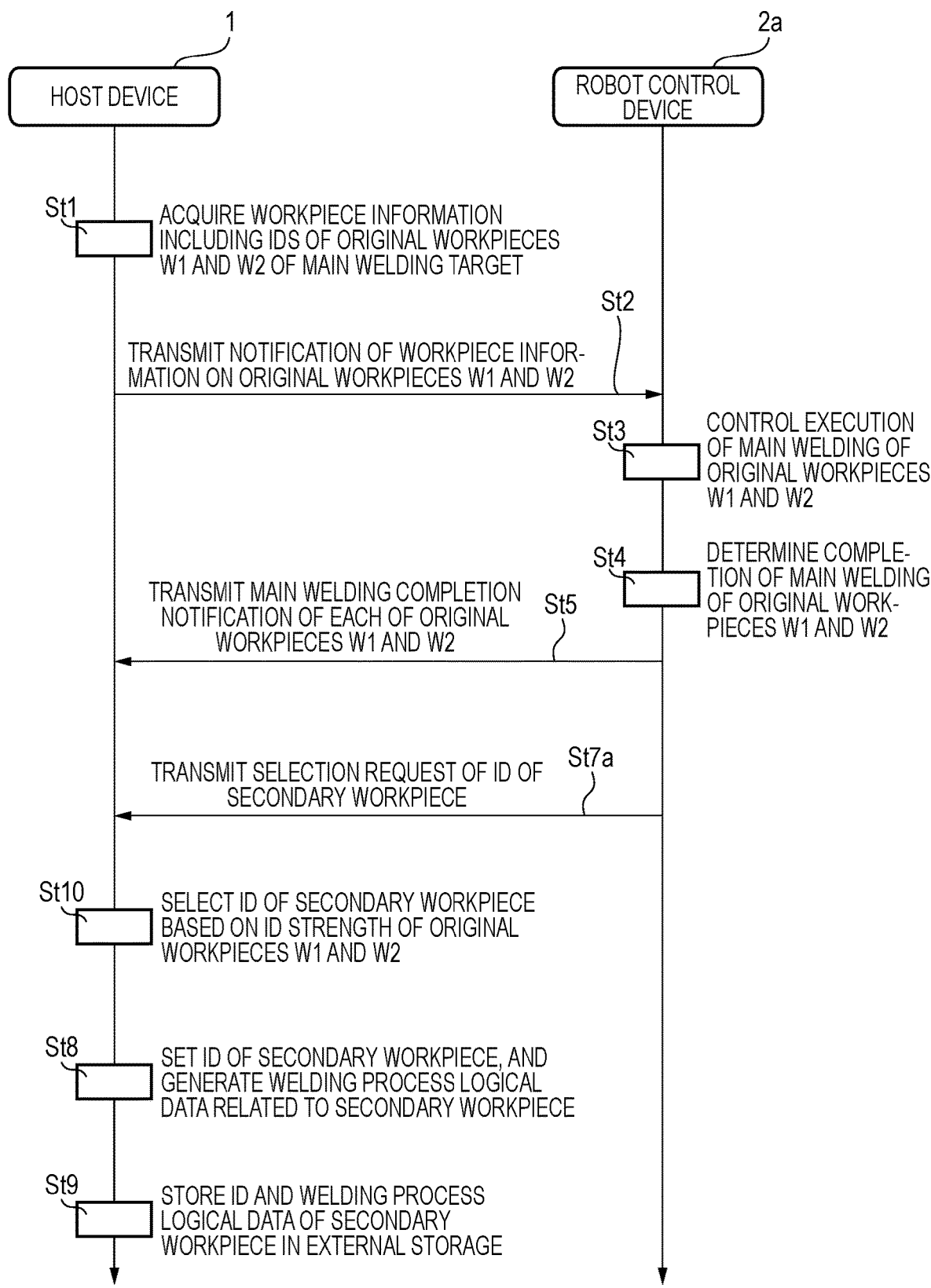
FIG. 10 is a sequence diagram showing an example of an operation procedure of ID management in a welding system according to the second embodiment.

Next, an operation procedure of the ID management by the welding system 100 according to the second embodiment will be described with reference to FIG. 10. FIG. 10 is a sequence diagram showing an example of an operation procedure of the ID management in the welding system 100 according to the second embodiment. In the description of FIG. 10, an operation procedure performed between the host device 1 and the robot control device 2a in the welding process using the original workpieces W1 and W2 shown in FIG. 3 will be described as an example, and the same processing as those in FIG. 8 are denoted by the same step numbers, the description thereof will be simplified or omitted, and different contents will be described.

In FIG. 10, after transmitting the main welding completion notification corresponding to each of the original workpieces W1 and W2 in step St5 to the host device 1a, the robot control device 2a transmits the secondary workpiece information (for example, workpiece information (for example, an ID and a name of the original workpiece, a welding portion of the original workpiece) including an ID of each of the plurality of original workpieces W1 and W2 used in the welding process, and a welding condition at the time of execution of the welding process) to the host device 1 (St7a).

When the host device 1a receives the secondary workpiece information (see the above description) transmitted from the robot control device 2a in step St7a, the host device 1a selects which ID of the original workpieces W1 and W2 is to be adopted as the ID of the secondary workpiece W3 according to a predetermined rule (see FIG. 5) based on the ID strength of the original workpieces W1 and W2 (St10). For example, it is assumed that the ID "A" of the original workpiece W1 is selected.

The host device 1a sets the ID "A" selected in step St10 as the ID "A" of the secondary workpiece W3, and generates the welding process logical data (see FIGS. 3 and 4) related to the secondary workpiece W3 (St8). The host device 1a stores the ID "A" of the secondary workpiece W3 and the welding process logical data related to the secondary workpiece W3 in association with each other in the external storage ST (St9).

As described above, in the welding system 100 according to the second embodiment, the host device 1a constituting the welding system 100 includes the memory 12 that holds information on the ID of each of the plurality of original workpieces, the communication unit 10 that communicates with the robot control device 2a that controls the execution of the welding process using the plurality of original workpieces, and the processor 11 that selects which of the IDs of the plurality of original workpieces is to be adopted according to the predetermined rule based on detection of the completion of the execution of the welding process by the robot control device 2a. The processor 11 sets the ID of any of the selected original workpieces as the ID of the welded workpiece generated by the welding process.

Accordingly, the host device 1a according to the second embodiment can support efficient management of the IDs of workpieces (in other words, welded workpieces) manufactured in the welding process in which the plurality of original workpieces are joined or the like. That is, as in JP-A-2017-102548 in the related art, a new ID is not set every time one workpiece is located in a different manufacturing machine (in other words, the main welding robot), and the ID of the manufactured welded workpiece is one of the IDs of the plurality of original workpieces used in the welding process by the host device 1a according to the second embodiment, so that the management of the ID by the user is simplified without increasing the ID uselessly.

Although the various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Further, components in the various embodiments described above may be combined optionally in the range without deviating from the spirit of the invention.

The present application is based on Japanese Patent Application (Japanese Patent Application No. 2019-188156) filed on Oct. 11, 2019, and contents thereof are incorporated herein by reference.

The present disclosure is useful as an identifier management method, a robot control device, and a comprehensive control device, which support efficient management of an identifier of a workpiece manufactured in a process such as welding.

The invention claimed is:

1. An identifier management method to be executed by a welding system, the identifier management method comprising:

acquiring information on identifiers of a plurality of original workpieces;

selecting, according to a predetermined rule, any one of the identifiers of the plurality of original workpieces to be adopted based on completion of execution of a welding process using the plurality of original workpieces by the welding system;

in response to a welding process command, causing a welding robot to weld the plurality of original workpieces using the welding process to generate a welded workpiece; and setting the any one of the identifiers of the original workpieces, which has been selected, as an identifier of the welded workpiece generated in the welding process, wherein each of the identifiers comprises a combination of a plurality of character codes, and wherein the predetermined rule comprises adopting an identifier having a strong character code based on a comparison of strength among the character codes constituting the identifiers of the plurality of original workpieces according to a strength rule defined for each type of character code.

2. The identifier management method according to claim 1, wherein the character codes comprise an alphabet and a number, and wherein the selecting of the any one of the identifiers of the original workpieces to be adopted comprises:

dividing the identifier of each of the plurality of original workpieces into segments of the alphabet and the number in order from an upper digit, and determining for each of the segments that the identifier is strong in a case in which an order of the alphabet is earlier or the number is larger; and selecting the any one of the identifiers of the original workpieces based on a determination result of a strength of each of the segments.

3. The identifier management method according to claim 1, wherein the character codes comprise an alphabet and a number, and wherein the selecting of the any one of the identifiers of the original workpieces to be adopted comprises:

dividing the identifier of each of the plurality of original workpieces into segments of the alphabet and the number in order from an upper digit, and determining for each of the segments that the identifier is strong in a case in which an order of the alphabet is later or the number is smaller; and selecting the any one of the identifiers of the original workpieces based on a determination result of a strength of each of the segments.

4. The identifier management method according to claim 1, further comprising:

generating and storing data indicating a relationship between the identifier of the welded workpiece and the identifiers of the respective original workpieces used in the welding process.

5. The identifier management method according to claim 4, wherein in a case in which the welding process includes a plurality of welding processes, the data indicates a temporal order of the plurality of welding processes.

6. The identifier management method according to claim 4, wherein the data comprises a welding condition of the welding process.

7. The identifier management method according to claim 1, further comprising:

holding a management table in a case in which an existing unique identifier is set in at least one of the plurality of original workpieces, the management table in which the unique identifier and a management identifier related to the welding process of the at least one of the original workpieces are associated with each other; and selecting, in the selecting of the any one of the identifiers of the original workpieces to be adopted, an identifier of one of the original workpieces from the management identifier corresponding to the unique identifier of the at least one of the original workpieces and an identifier of an original workpiece other than the at least one original workpiece.

8. A robot control device constituting a welding system, the robot control device comprising:

a memory configured to hold information on identifiers of a plurality of original workpieces;

a processor configured to control a welding robot to allow execution of a welding process using the plurality of original workpieces; and a communication unit configured to communicate with a comprehensive control device that performs comprehensive control of the welding system, wherein the processor is configured to:

select, according to a predetermined rule, any one of the identifiers of the respective original workpieces to be adopted based on completion of the execution of the welding process by the welding robot; and transmit, to the comprehensive control device via the communication unit, a setting request for setting, as an identifier of a welded workpiece generated in the welding process, the any one of the identifiers of the original workpieces which has been selected, wherein each of the identifiers comprises a combination of a plurality of character codes, and wherein the predetermined rule comprises adopting an identifier having a strong character code based on a comparison of strength among the character codes constituting the identifiers of the plurality of original workpieces according to a strength rule defined for each type of character code.

9. A comprehensive control device constituting a welding system, the comprehensive control device comprising:

a memory configured to hold information on identifiers of a plurality of original workpieces;

a communication unit configured to communicate with a robot control device configured to control execution of a welding process using the plurality of original workpieces; and a processor configured to select, according to a predetermined rule, any one of the identifiers of the plurality of original workpieces to be adopted based on detection of completion of the execution of the welding process by the robot control device, wherein the processor is configured to:

set, as an identifier of a welded workpiece generated in the welding process, the any one of the identifiers of the original workpieces which has been selected, wherein each of the identifiers comprises a combination of a plurality of character codes, and wherein the predetermined rule comprises adopting an identifier having a strong character code based on a comparison of strength among the character codes constituting the identifiers of the plurality of original workpieces according to a strength rule defined for each type of character code.

\* \* \* \* \*